US009381957B1

(12) United States Patent
Auden et al.

(10) Patent No.: US 9,381,957 B1
(45) Date of Patent: Jul. 5, 2016

(54) ADAPTABLE AERODYNAMIC SPOILER FOR A MOTOR VEHICLE

(71) Applicant: GM GLOBAL TECHNOLOGY OPERATIONS LLC, Detroit, MI (US)

(72) Inventors: Joshua R. Auden, Brighton, MI (US); Hesham A. Ezzat, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/682,562

(22) Filed: Apr. 9, 2015

(51) Int. Cl.
*B60J 9/00* (2006.01)
*B62D 35/00* (2006.01)
*G05D 7/06* (2006.01)

(52) U.S. Cl.
CPC ............ *B62D 35/007* (2013.01); *G05D 7/0676* (2013.01)

(58) Field of Classification Search
CPC ......... A61L 27/16; A61L 17/04; C08L 23/06; D01F 6/04; A61M 1/30; B62D 35/007; B60J 7/0573; B60J 7/047; B60J 7/0435; Y10S 180/903
USPC .......................... 296/180.5; 180/903; 280/755
See application file for complete search history.

(56) References Cited

U.S. PATENT DOCUMENTS

| | | | | |
|---|---|---|---|---|
| 3,455,594 A * | 7/1969 | Mrlik | ..................... | B60G 17/00 188/270 |
| 3,914,898 A * | 10/1975 | Ferguson | ............... | A63H 17/26 446/470 |
| 4,174,863 A * | 11/1979 | Gotz | ..................... | B62D 35/007 296/180.5 |
| 4,558,898 A * | 12/1985 | Deaver | ................. | B62D 35/007 264/251 |
| 4,671,555 A * | 6/1987 | Linz | ..................... | B62D 35/007 296/180.5 |
| 4,847,024 A * | 7/1989 | Loren | .................. | B62D 35/007 264/263 |
| 4,854,635 A * | 8/1989 | Durm | .................. | B62D 35/007 296/180.1 |
| 4,886,312 A * | 12/1989 | Asoh | ...................... | B60J 1/1884 296/146.2 |
| 4,889,382 A * | 12/1989 | Burst | ...................... | F01P 11/10 180/68.1 |
| 5,236,242 A * | 8/1993 | Seeman | ............... | B62D 35/001 296/180.1 |
| 5,337,190 A * | 8/1994 | Kogita | ..................... | B60D 1/36 359/841 |
| 5,356,195 A * | 10/1994 | Kanda | .................. | B62D 35/007 296/146.8 |
| 5,678,884 A * | 10/1997 | Murkett | ............... | B62D 35/007 180/68.1 |
| 5,724,198 A * | 3/1998 | Nishikawa | ................ | B60R 1/12 359/841 |

(Continued)

*Primary Examiner* — Kiran B Patel
(74) *Attorney, Agent, or Firm* — Quinn Law Group, PLLC

(57) ABSTRACT

A vehicle includes a vehicle body having a first vehicle body end configured to face oncoming ambient airflow when the vehicle is in motion relative to a road surface. The vehicle additionally includes a spoiler assembly mounted to the vehicle body. The spoiler assembly includes a spoiler body configured to control a movement of the ambient airflow along the vehicle body. The spoiler body includes a frame having an upper side, a lower side, a leading edge, and a trailing edge. The spoiler body also includes a first fluid bladder arranged on the upper side of the frame and a second fluid bladder arranged on the lower side of the frame. The spoiler assembly also includes a mechanism configured to selectively supply and remove fluid from the first and second fluid bladders.

20 Claims, 5 Drawing Sheets

(56) References Cited

U.S. PATENT DOCUMENTS

| | | | | |
|---|---|---|---|---|
| 5,812,095 A * | 9/1998 | Adrian | ............... | H01Q 1/3275 343/713 |
| 5,845,827 A * | 12/1998 | Reising | ............... | B60R 9/05 224/309 |
| 5,934,740 A * | 8/1999 | Moebius | ............... | B62D 35/007 296/180.1 |
| 6,030,028 A * | 2/2000 | Radmanic | ............... | B62D 35/007 296/146.16 |
| 6,170,904 B1 * | 1/2001 | Schaedlich | ............... | B62D 35/007 180/903 |
| 6,196,620 B1 * | 3/2001 | Haraway, Jr. | ............... | B62D 35/007 180/903 |
| 6,338,524 B1 * | 1/2002 | Wu | ............... | B62D 35/007 180/903 |
| 6,712,424 B2 * | 3/2004 | Swain | ............... | B62D 35/007 224/519 |
| 7,052,074 B2 * | 5/2006 | Dringenberg | ............... | B62D 35/007 296/180.5 |
| 7,201,432 B2 * | 4/2007 | Roth | ............... | B62D 35/007 296/180.5 |
| D547,707 S * | 7/2007 | Kulla | ............... | D12/181 |
| 7,287,798 B2 * | 10/2007 | King | ............... | B60P 3/40 296/180.1 |
| 7,665,796 B2 * | 2/2010 | Wegener | ............... | B62D 35/007 180/903 |
| 7,841,646 B2 * | 11/2010 | Paul | ............... | B62D 37/02 296/180.1 |
| 8,113,571 B2 * | 2/2012 | Goenueldinc | ............... | B62D 35/007 296/180.1 |
| 8,215,703 B2 * | 7/2012 | Goenueldinc | ............... | B62D 35/007 296/180.1 |
| 8,960,770 B2 * | 2/2015 | De Luca | ............... | B62D 37/02 296/180.5 |
| 2009/0224108 A1 * | 9/2009 | Lutke | ............... | B64C 3/46 244/219 |

* cited by examiner

ADAPTABLE AERODYNAMIC SPOILER FOR A MOTOR VEHICLE

TECHNICAL FIELD

The disclosure relates to an aerodynamic spoiler with an adaptable structure for enhancement of aerodynamics of a motor vehicle.

BACKGROUND

Automotive aerodynamics is the study of aerodynamics of road vehicles. The main goals of the study are reducing drag and wind noise, minimizing noise emission, and preventing undesired lift forces and other causes of aerodynamic instability at high speeds. Additionally, the study of aerodynamics may also be used to achieve downforce in high-performance vehicles in order to improve vehicle traction and cornering abilities. The study is typically used to shape vehicle bodywork along with employing dedicated aerodynamic devices for achieving a desired compromise among the above characteristics for specific vehicle use.

A spoiler is an automotive aerodynamic device intended to "spoil" unfavorable air movement across a body of a vehicle in motion, usually described as turbulence or drag. Spoilers can be fitted at the front and/or at the rear of the vehicle body. Spoilers on the front of a vehicle are often called air dams. When the vehicle is in motion, in addition to directing air flow, such air dams also reduce the amount of air flowing underneath the vehicle which generally reduces aerodynamic lift and drag.

Additionally, when the vehicle is in motion, the flow of air at the rear of the vehicle becomes turbulent and a low-pressure zone is created, increasing drag and instability. Adding a spoiler at the rear of the vehicle body can help to delay flow separation from the body and a higher pressure zone created in front of the spoiler can help reduce lift on the vehicle body by creating downforce. As a result, in certain instances aerodynamic drag can be reduced and high speed stability will generally be increased due to the reduced rear lift.

SUMMARY

A vehicle includes a vehicle body having a first vehicle body end configured to face oncoming ambient airflow when the vehicle is in motion relative to a road surface. The vehicle additionally includes a spoiler assembly mounted to the vehicle body. The spoiler assembly includes a spoiler body configured to control a movement of the ambient airflow along the vehicle body. The spoiler body may have a wing-like shape. The spoiler body includes a frame providing a support structure therefor. The frame includes an upper side, a lower side, a leading edge, and a trailing edge. The spoiler body also includes a first fluid bladder arranged on the upper side of the frame and a second fluid bladder arranged on the lower side of the frame. The spoiler assembly also includes a mechanism configured to selectively inflate and deflate the first and second fluid bladders, i.e., alter the shape of each bladder, via respectively supplying a fluid thereto and removing the fluid therefrom.

The vehicle may also include a third fluid bladder arranged on the leading edge of the frame. The mechanism may be configured to selectively inflate and deflate the third fluid bladder via respectively supplying a fluid thereto and removing the fluid therefrom.

The vehicle may also include a controller configured to regulate the mechanism.

The vehicle may also include a road wheel and a first sensor configured to detect a rotating speed of the road wheel and communicate the detected rotating speed of the road wheel to the controller.

The vehicle may additionally include a second sensor configured to detect a yaw rate of the vehicle body and communicate the detected yaw rate to the controller; a steering wheel configured to control a direction of the vehicle via a steering wheel angle; and a third sensor configured to detect the steering wheel angle and communicate the detected steering wheel angle to the controller.

The controller may be configured to regulate the mechanism to selectively inflate and deflate each of the first, second, and third fluid bladders in response to the detected yaw rate, steering wheel angle, and rotating speed of the road wheel to thereby selectively vary an aerodynamic downforce on the vehicle body.

By regulating the mechanism, the controller may deflate the first fluid bladder and inflate the second fluid bladder to increase downforce and reduce the detected yaw rate. Also, the controller may inflate the first fluid bladder and deflate the second fluid bladder to decrease downforce and increase the detected yaw rate. Additionally, the controller may deflate each of the first and the second fluid bladders to decrease aerodynamic drag.

The vehicle body may have a longitudinal body axis. At least one of the first, second, and third fluid bladders may be split into a pair of individually inflatable bladders. In such a case, one bladder of the pair of individually inflatable bladders may be arranged to one side of the longitudinal body axis and the other bladder of the pair of individually inflatable bladders may be arranged to the other side of the longitudinal body axis. Furthermore, the controller may be configured to regulate the mechanism to selectively and individually supply the fluid to and remove the fluid from each of the pair of individually inflatable bladders in response to the detected yaw rate, steering wheel angle, and rotating speed of the road wheel.

The mechanism may include a fluid pump and a fluid valve configured to control supply of the fluid to each of the first, second, and third fluid bladders.

The spoiler assembly may also include an elastic membrane configured to cover the spoiler body.

The vehicle body may include a second vehicle body end opposite of the first vehicle body end. The spoiler body may be mounted at one of the first vehicle body end and the second vehicle body end.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
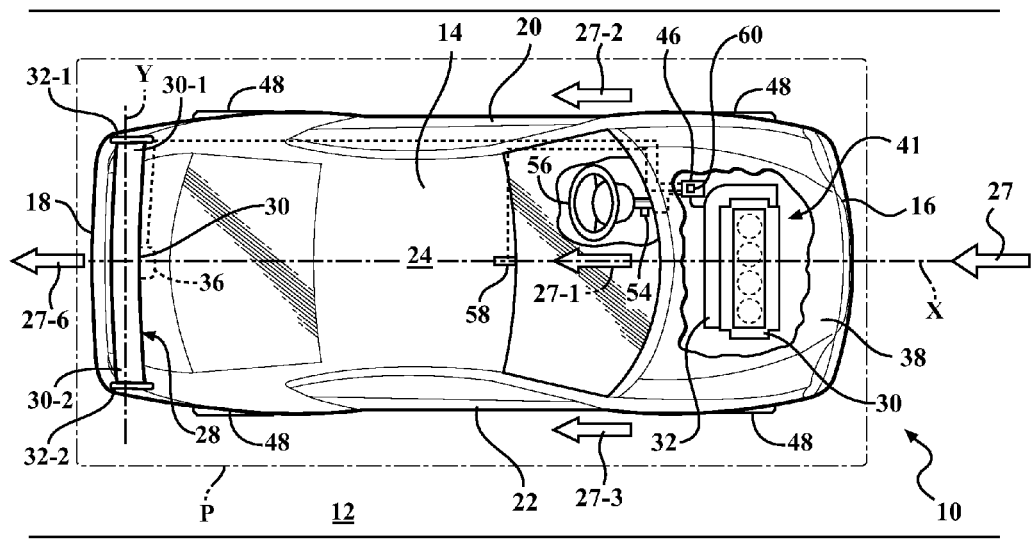
FIG. 1 is a schematic top view of a vehicle having vehicle body arranged in a body plane and along a longitudinal axis, and having a spoiler assembly with first and second fluid bladders according to the disclosure.

Referring to the drawings, wherein like reference numbers refer to like components, FIG. 1 shows a schematic view of a motor vehicle 10 positioned relative to a road surface 12. The vehicle 10 includes a vehicle body 14 arranged in a body plane P that is substantially parallel to the road surface 12. The vehicle body 14 defines six body sides. The six body sides include a first body end or front end 16, an opposing second body end or rear end 18, a first lateral body side or left side 20, and a second lateral body side or right side 22, a top body portion 24, which may include a vehicle roof, and an underbody portion 26.

The left side 20 and right side 22 are disposed generally parallel to each other and with respect to a virtual longitudinal axis X of the vehicle 10, and span the distance between the front end 16 and the rear end 18. The body plane P is defined to include the longitudinal axis X. A passenger compartment (not shown) of the vehicle 10 is generally bounded by the front and rear ends 16, 18 and the left and right sides of the body 14. As understood by those skilled in the art, the front end 16 is configured to face an oncoming ambient airflow 27 when the vehicle 10 is in motion relative to the road surface 12. When the vehicle 10 is in motion, the oncoming ambient airflow 27 moves substantially parallel to the body plane P and along the longitudinal axis X.

As the vehicle 10 moves relative to the road surface 12, the ambient airflow 27 passes around the vehicle body 14 and splits into respective first airflow portion 27-1, second airflow portion 27-2, third airflow portion 27-3, and fourth airflow portion 27-4, that eventually rejoin in a wake area or recirculating airflow region 27-6 immediately behind the rear end 18. Specifically, as shown in FIG. 1, the first airflow portion 27-1 passes over the top body portion 24, second airflow portion 27-2 passes over the left side 20, third airflow portion 27-3 passes over the right side 22, and fourth airflow portion 27-4 (shown in FIG. 2) passes under the vehicle body 14, between the underbody portion 26 and the road surface 12. As understood by those skilled in the art, the recirculating airflow region 27-6 is generally caused at elevated vehicle speeds by the flow of surrounding air around the six body sides of the vehicle body 14.

Figure 2:
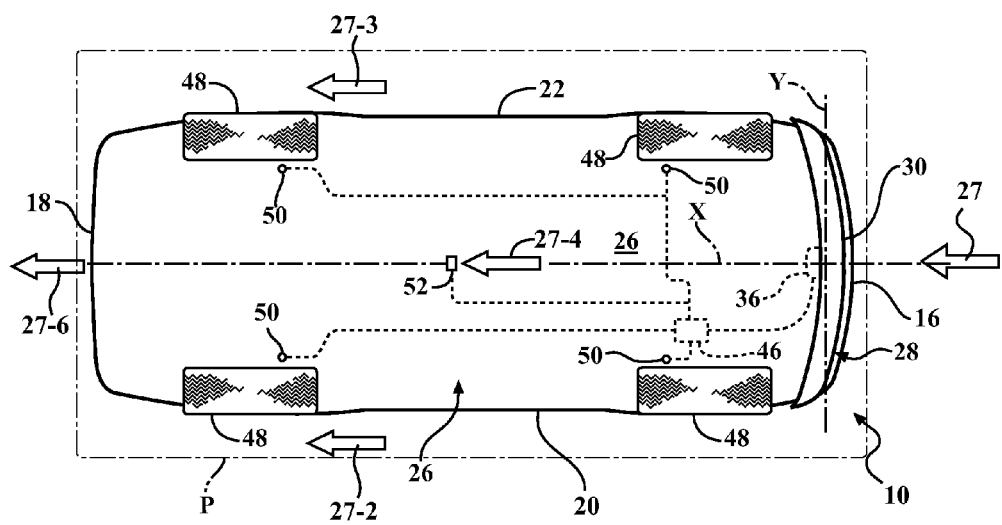
FIG. 2 is a schematic bottom view of the vehicle shown in FIG. 1 and having a spoiler assembly with first and second fluid bladders according to another embodiment the disclosure.

As shown in FIGS. 1 and 2, the vehicle 10 also includes a spoiler assembly 28. The spoiler assembly 28 includes a spoiler body 30 arranged along a spoiler axis Y and configured to control a movement of the ambient airflow 27 along the vehicle body 14. The spoiler body 30 may be wing-shaped. "Wing-shaped" is herein defined as having a shape of a wing, i.e., a fin having a shape of an airfoil defined by a streamlined cross-sectional shape producing lift for flight or propulsion through a fluid. As can be seen in FIG. 1, the spoiler axis Y may be positioned transversely to the longitudinal body axis X. Additionally, the spoiler axis Y is also arranged substantially parallel to the body plane P. The spoiler assembly 28 may by connected to the vehicle body 14 via one or more stanchions 29. The stanchion(s) 29 may connect the spoiler body 30 at the front end 16. Similarly, the stanchion(s) 29 may connect the spoiler body 30 at the rear end 18.

When mounted on the front end 16 of the vehicle body 14 (as shown in FIG. 2), the spoiler assembly 28 functions as an air dam that varies a downforce FD1 exerted by the ambient airflow 27 at the front of the vehicle. On the other hand, when the spoiler assembly 28 is mounted on the rear end 18 of the vehicle body 14 (as shown in FIG. 1), the spoiler assembly varies a downforce FD2 exerted by the ambient airflow 27 at the rear of the vehicle. Accordingly, the spoiler assembly 28 mounted on the front end 16 may be employed to increase the downforce FD1 at the front of the vehicle, while the spoiler assembly mounted on the rear end 18 may be employed to increase the downforce FD2 at the rear of the vehicle in order to increase vehicle fraction. The stanchion 29 is configured to support the spoiler body 30 relative to the vehicle body 14 in order to apply the respective downforce FD1 or FD2 to the vehicle body when the vehicle 10 is in motion.

Figure 3:
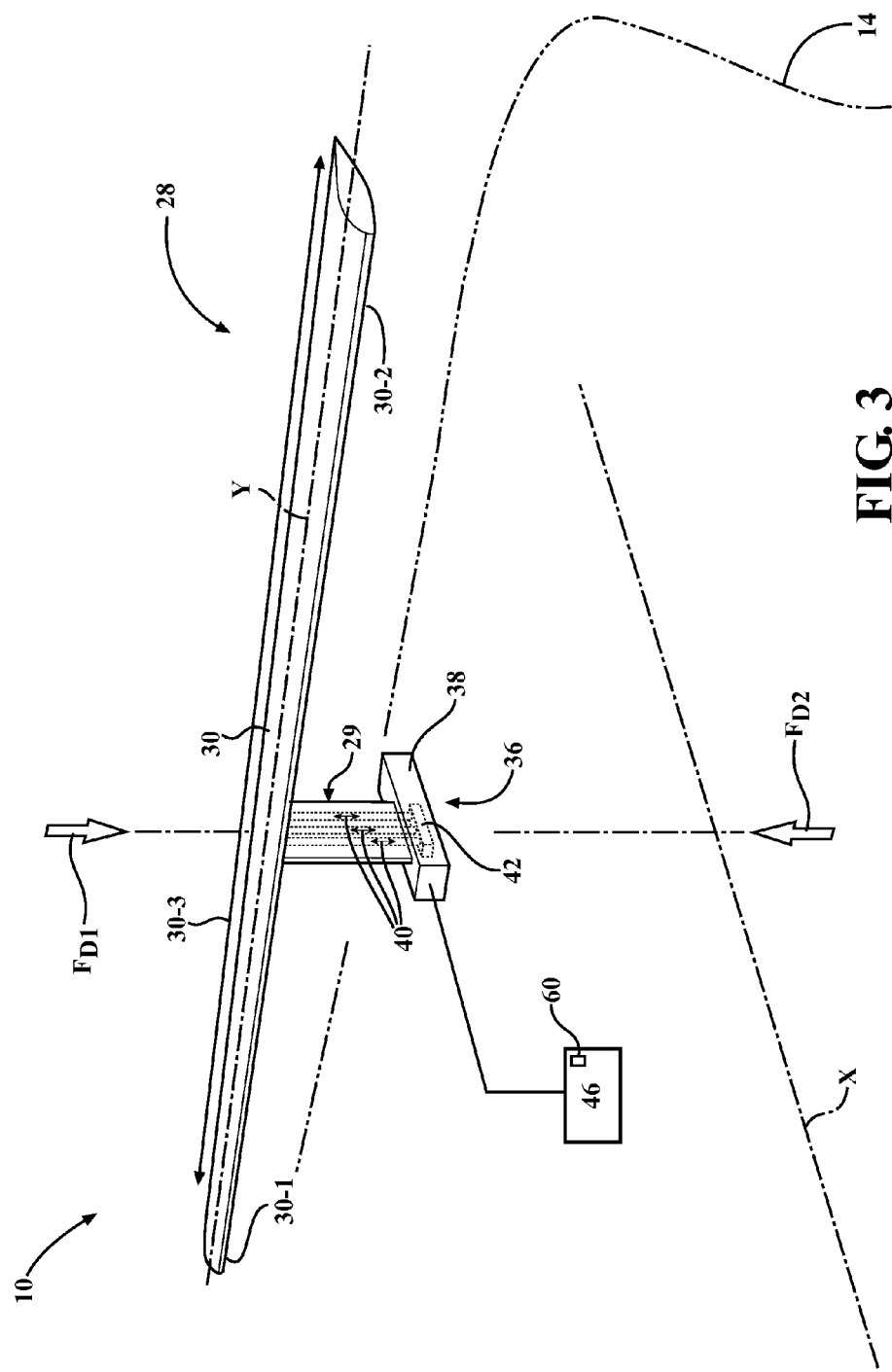
FIG. 3 is a schematic perspective view of a representative spoiler assembly for each of the embodiments shown in FIGS. 1 and 2.

As shown in FIGS. 1 and 2, the spoiler body 30 is defined by a first end 30-1, a second end 30-2, and a length 30-3. As shown in cross-sectional views in FIGS. 3-5, the spoiler body 30 includes a frame 32 that acts as a support structure for the spoiler assembly 28. The frame 32 includes an upper side 32-1, a lower side 32-2, a leading edge 32-3, and a trailing edge 32-4. The leading edge 32-3 of the frame 32 supports the portion of the spoiler body 30 that initially comes in contact with or receives the ambient airflow 27 as the vehicle 10 moves relative to the road surface 12. Conversely, the trailing edge 32-4 of the frame 32 supports the portion of the spoiler body 30 from which the ambient airflow 27 departs the spoiler body. The frame 32 may be formed from a suitably rigid but low mass material, such as an engineered plastic or aluminum, for structural stability. The spoiler body 30 also includes an inflatable first fluid bladder 34-1 arranged on the upper side 32-1 and an inflatable second fluid bladder 34-2 arranged on the lower side 32-2 of the frame 32. The spoiler body 30 may also include an inflatable third fluid bladder 34-3 arranged on the leading edge 32-3 of the frame 32.

As shown, the spoiler assembly 28 also includes a mechanism 36. The mechanism 36 is configured to alter the shape of each of the first fluid bladder 34-1 and second fluid bladder 34-2, and can also alter the shape of the third fluid bladder 34-3 in the case where the spoiler body 30 includes such a component. The mechanism 36 may include a fluid pump 38 configured to supply a fluid 40 to the respective bladders 34-1, 34-2, 34-3 through attendant fluid passage(s) 41, and a fluid valve assembly 42 having one or more individual fluid valves configured to control the supply of fluid 40 to the first, second, and third fluid bladders. As shown in FIGS. 3-7, the fluid passage(s) 41 may be arranged in the stanchion(s) 29. Accordingly, the mechanism 36 may alter the shape of the first, second, and third fluid bladders 34-1, 34-2, 34-3 by selectively supplying the fluid 40 thereto and removing the fluid therefrom to thereby respectively inflate and deflate the subject fluid bladders and control the wing-like shape of the spoiler body 30. The fluid 40 may be working liquid, such as oil or water, or a gas, such as air. The spoiler assembly 28 additionally includes an elastic membrane 44 having a substantially uniform outer surface 44-1 and configured to cover the spoiler body 30. The elastic membrane 44 may be constructed from a suitable material, such as a polymer or a spring steel, that can adapt its contour to the altered shape of the first, second, and third fluid bladders 34-1, 34-2, 34-3 while retaining the outer surface 44-1 substantially smooth and even such that the airflow 28 can traverse undisturbed relative thereto.

The vehicle also includes an electronic controller 46 configured, i.e., constructed and programmed, to regulate the mechanism 36. The controller 46 may be configured as a central processing unit (CPU) configured to regulate operation of an internal combustion engine 41 (shown in FIG. 1), a hybrid-electric powertrain (not shown), or other alternative types of powerplants, as well as other vehicle systems, or a dedicated controller. In order to appropriately control operation of the mechanism 36, the controller 46 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 46 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 46 may also include a floppy disk, a flexible disk, hard disk, magnetic tape, any other magnetic medium, a CD-ROM, DVD, any other optical medium, etc. The controller 46 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 46 or accessible thereby may be stored in the memory and automatically executed to provide the required functionality.

The vehicle 10 also includes road wheels 48. A plurality of first sensors 50 may be arranged on the vehicle body 14 for detecting rotating speeds of each road wheel 48 (shown in FIG. 2). Each first sensor 50 may also be configured to communicate the detected rotating speed of the respective road wheel 48 to the controller 46, while the controller may be configured to correlate the data received from the respective first sensors to road speed of the vehicle 10. The vehicle 10 may also include a second sensor 52 (shown in FIG. 2) configured to detect a yaw moment or rate on the vehicle body 14 relative to the road surface 12 and communicate the detected yaw rate to the controller 46. Additionally, the vehicle 10 may include a third sensor 54 operatively connected to a steering wheel 56 (shown in FIG. 1) and configured to detect an angle of the steering wheel during operation of the vehicle. An intended direction of the vehicle 10 may be identified by the steering wheel angle detected by the third sensor 54 and communicated to the controller 46.

The vehicle may additionally include a fourth sensor 58 (shown in FIG. 1) configured to detect a velocity of ambient airflow 28 relative to the vehicle 10. The fourth sensor may be additionally configured to communicate the detected velocity of the ambient airflow to the controller 46. Such a fourth sensor 58 may, for example, be a pitot tube configured to detect a pressure of the ambient airflow 28 at a specific location relative to the vehicle body 14 and the controller 46 can correlate the measured pressure to airflow velocity.

The controller 46 may selectively vary the shape of each of the respective bladders 34-1, 34-2, 34-3 during cornering of the vehicle 10 in response to the yaw rate detected by the second sensor 52. Furthermore, the controller 46 may be configured to vary the shape of each of the respective bladders 34-1, 34-2, 34-3 in response to the rotating speeds of the road wheels 48 detected via the first sensor 50 and/or the velocity of the ambient airflow 28 detected via the fourth sensor 58. Accordingly, the shape of each of the respective bladders 34-1, 34-2, 34-3 can be controlled proportionately to the yaw rate generated during cornering of vehicle 10 by selectively inflating and deflating the respective bladders via the mechanism 36. The controller 46 may be programmed with a look-up table 60 establishing correspondence between the vehicle yaw rate, vehicle road speed, and/or velocity of the airflow and appropriate volume of fluid 40 inside each of the bladders 34-1, 34-2, 34-3 for affecting appropriate regulation of the mechanism 36. The look-up table 60 may be developed empirically during validation and testing of the vehicle 10.

The controller 46 may be additionally programmed to determine a slip of the vehicle 10 relative to the road surface 12. The slip of the vehicle 10 may include a measure of how much each of the road wheels 48 has slipped in a direction that is generally perpendicular to the longitudinal vehicle axis X, which identifies that the vehicle has deviated from the intended direction or path along the road surface 12 as identified by the steering wheel angle detected by the third sensor 54. The controller 46 may be programmed to compare the determined steering wheel angle and yaw rate to determine how much the vehicle had deviated from its intended direction or path. The controller 46 may also be programmed to control the slip of the vehicle 10 relative to the road surface 12 by selectively inflating and deflating the respective bladders 34-1, 34-2, 34-3 via the mechanism 36 in response to how much the vehicle has deviated from its intended path. The altered shape of the specific bladder(s) 34-1, 34-2, and 34-3 then urges the vehicle 10 to return to the actual vehicle heading to the desired heading being commanded by an operator of the vehicle at the steering wheel 56.

As the shape of the specific bladder(s) 34-1, 34-2, and 34-3 is varied during the cornering event, the spoiler assembly 28 positioned at the front end 16 is able to use the ambient airflow 27 more effectively in order to maximize the downforce FD1 at the front end of the vehicle body 14. Similarly, the spoiler assembly 28 positioned at the rear end 18 is able to use the ambient airflow 27 more effectively during the cornering event via varying the shape of specific bladder(s) 34-1, 34-2, and 34-3 in order to maximize the downforce FD2 at the rear end of the vehicle body 14.

Figure 4:
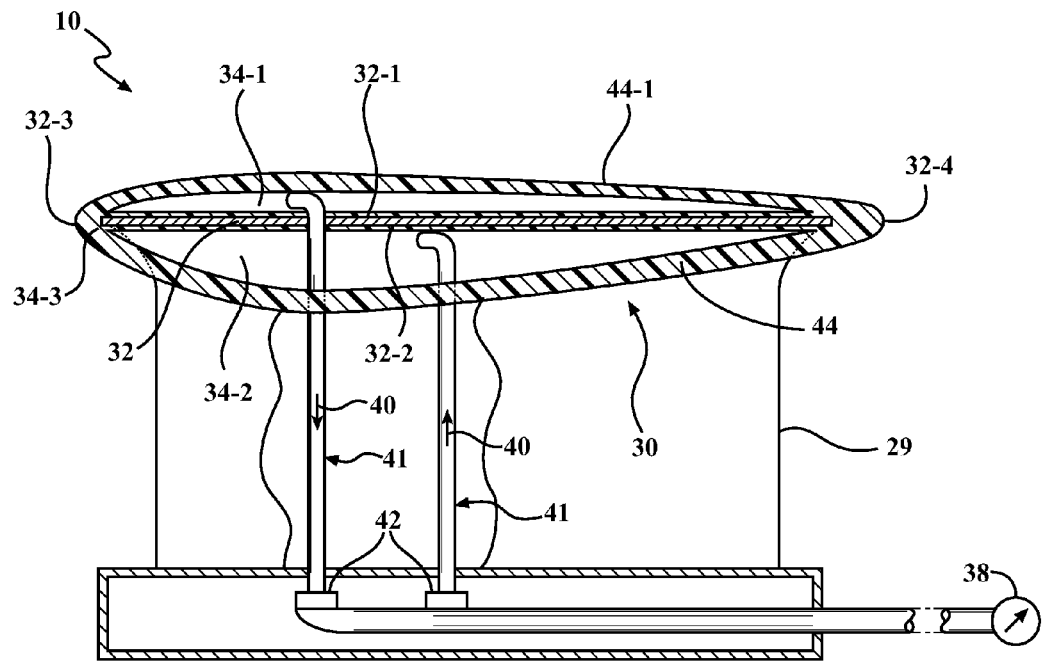
FIG. 4 is a schematic cross-sectional side view of the spoiler assembly for each of the embodiments shown in FIGS. 1 and 2; the first bladder is shown deflated and the second bladder is shown inflated.
Figure 5:
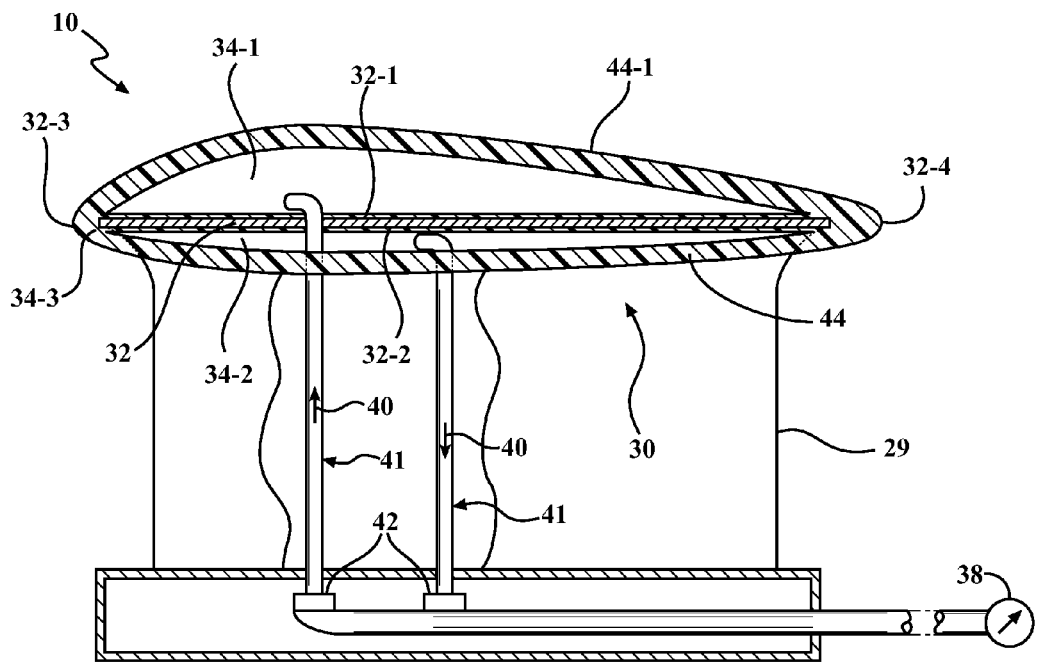
FIG. 5 is a schematic cross-sectional side view of the spoiler assembly for each of the embodiments shown in FIGS. 1 and 2; the first bladder is shown inflated and the second bladder is shown deflated.
Figure 6:
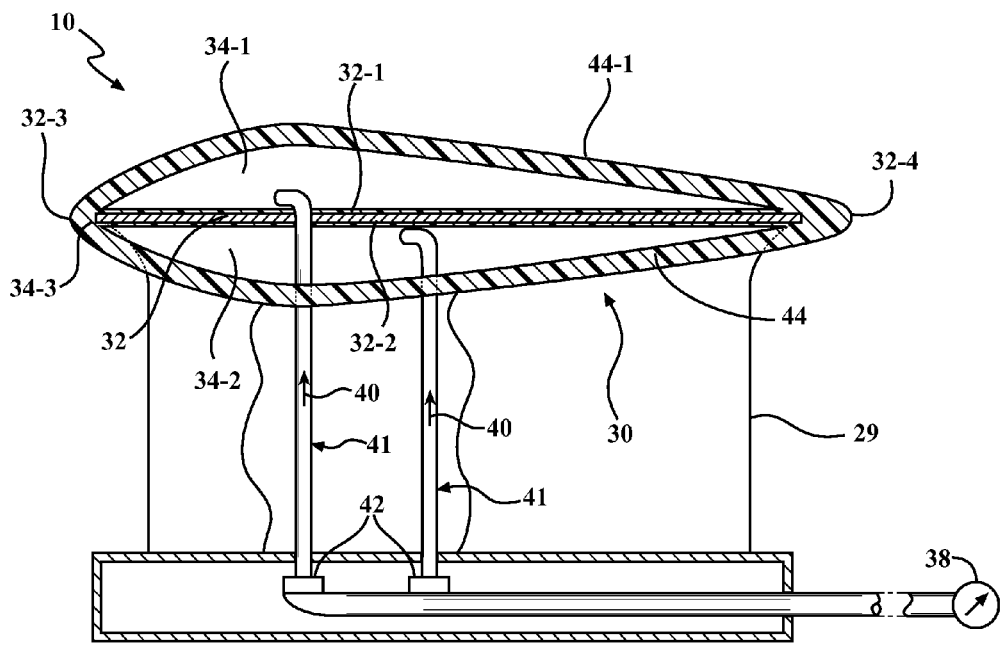
FIG. 6 is a schematic cross-sectional side view of the spoiler assembly for each of the embodiments shown in FIGS. 1 and 2; the first and second bladders are shown deflated.
Figure 7:
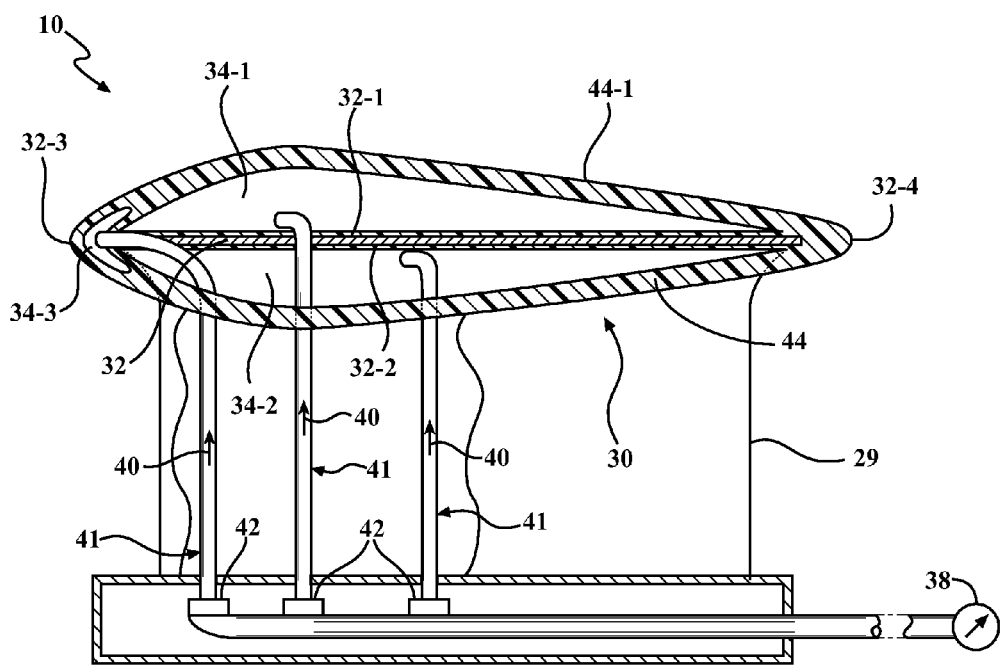
FIG. 7 is a schematic cross-sectional side view of the spoiler assembly for each of the embodiments shown in FIGS. 1 and 2; the spoiler assembly additionally having a third bladder, and wherein the first, second, and third bladders are shown inflated.

According to the above description, during operation of the vehicle 10 via regulating the mechanism 36, the controller 46 may remove the fluid 40 from the first fluid bladder 34-1 and supply the fluid to the second fluid bladder 34-2 in the respective front end 16 and/or rear end 18 mounted spoiler assemblies 28 to increase downforce FD1, FD2 and reduce the detected yaw rate of the vehicle body 14 (shown in FIG. 4). Also, the controller 46 may supply the fluid 40 to the first fluid bladder 34-1 and remove the fluid from the second fluid bladder 34-2 to decrease downforce FD1, FD2 and increase the detected yaw rate of the vehicle body 14 (shown in FIG. 5). Furthermore, the controller 46 may remove the fluid 40 from each of the first fluid bladder 34-1 and from the second fluid bladder 34-2 to decrease aerodynamic drag on the vehicle body 14 (shown in FIG. 6). Additionally, the controller 46 may selectively supply the fluid 40 to (shown in FIG. 7)

and remove the fluid from the third fluid bladder 34-3 to alter the shape of the leading edge 32-3 of the spoiler body 30 in order to complement the alteration of the first fluid bladder 34-1 and/or the second fluid bladder 34-2.

By varying the shape of the third fluid bladder 34-3 in coordination with the first and second fluid bladders 34-1, 34-2, a relatively smooth transition can be generated between the leading edge 32-3 and the upper and lower sides 32-1, 32-2 during various maneuvers of the vehicle 10. Specifically, by creating a "sharper", i.e., smaller, leading edge radius on the leading edge 32-3, aerodynamic drag reduction on the vehicle body 14 can be enhanced. Conversely, creating a more "blunt", i.e., larger, leading edge 32-3 radius, aerodynamic drag on the vehicle body 14 is generally increased. However, because a more blunt leading edge 32-3 radius renders the transition to either the first fluid bladder 34-1 or the second fluid bladder 34-2 more smooth, supplying additional fluid to the third fluid bladder 34-3 can result in respectively increased lift or downforce.

Accordingly, regulation of the shapes of the respective bladders 34-1, 34-2, 34-3 may be employed to maintain contact of the vehicle 10 with the road surface 12 at elevated speeds by countering aerodynamic lift of the vehicle body 14 in response to the velocity of ambient airflow 27 detected by the third sensor 54. Additionally, regulation of the shapes of the respective bladders 34-1, 34-2, 34-3 may be employed to aid handling of the vehicle 10 in order to maintain the vehicle on its intended path by countering the yaw moment acting on the vehicle body 14 as detected by the second sensor 52.

Figure 8:
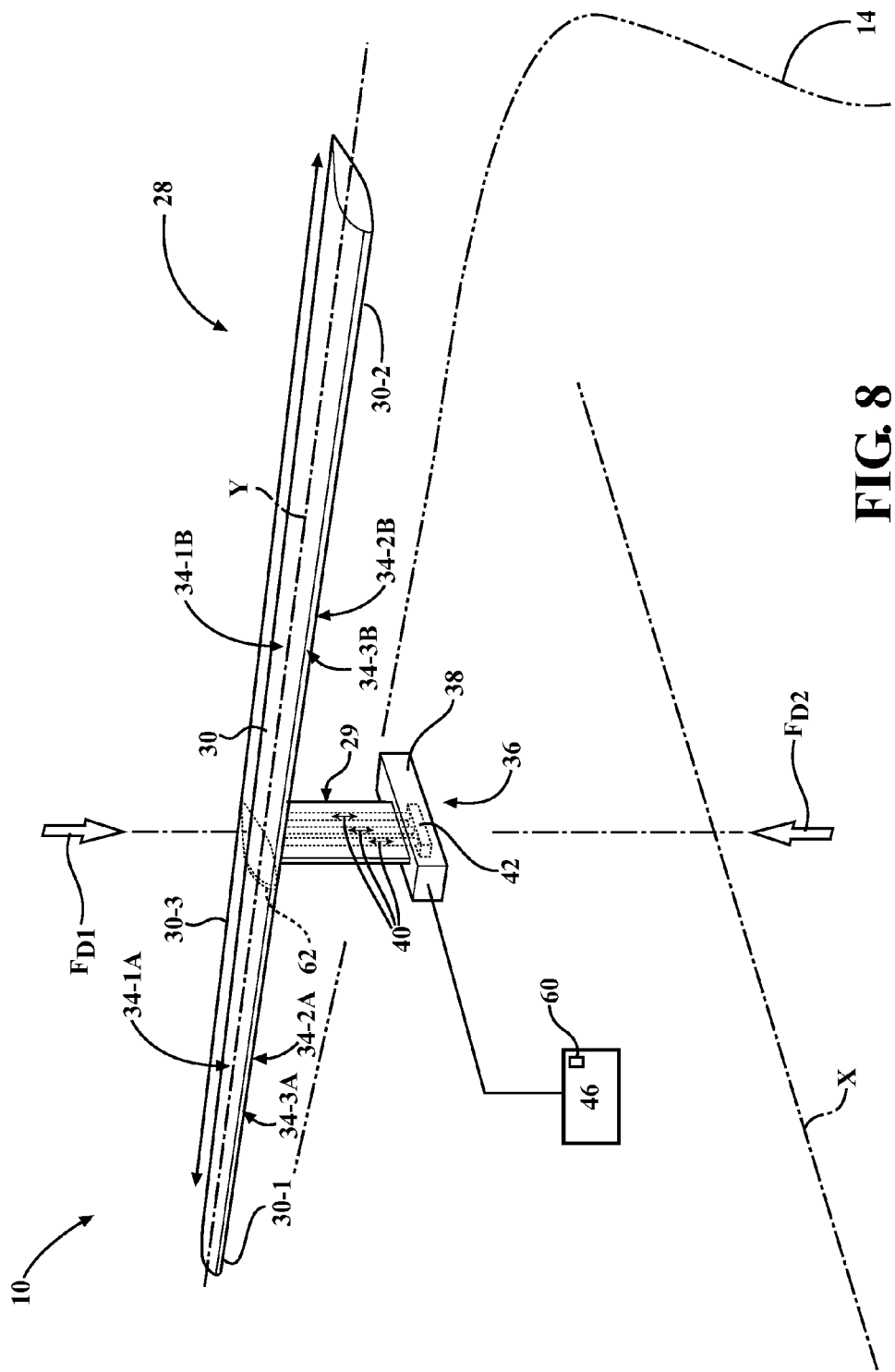
FIG. 8 is a schematic perspective view of an alternative embodiment for spoiler assemblies shown in FIGS. 1 and 2.

In another embodiment of the spoiler assembly 28 shown in FIG. 8, each of the first, second, and third fluid bladders 34-1, 34-2, 34-3 may be split into a pair of individually inflatable bladders 34-1A and 34-1B, 34-2A and 34-2B, and 34-3A and 34-3B. In such a case, one set of bladders 34-1A, 34-2A, and 34-3A may be arranged to one side of the longitudinal body axis X, while the other set of bladders 34-1B, 34-2B, and 34-3B may be arranged to the other side of the longitudinal body axis X. The bladders 34-1A, 34-2A, and 34-3A may be separated from the bladders 34-1B, 34-2B, and 34-3B by a divider 62, for example connected to the stanchion 29 positioned along the longitudinal body axis X, as shown in FIG. 8. The above arrangement may permit individual control over the respective bladders 34-1A, 34-2A, and 34-3A and 34-1B, 34-2B, and 34-3B to further aid handling of the vehicle 10 and maintain the vehicle on its intended path by countering the yaw moment acting on the vehicle body 14. Accordingly, the controller 46 may be programmed to regulate the mechanism 36 to selectively and individually supply the fluid 40 to and remove the fluid from each of the pair of individually inflatable bladders 34-1A, 34-2A, 34-3A, 34-1B, 34-2B, and 34-3B in response to the detected yaw rate, steering wheel angle, and rotating speed of the road wheel.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
   a vehicle body having a first vehicle body end configured to face oncoming ambient airflow when the vehicle is in motion relative to a road surface; and
   a spoiler assembly mounted to the vehicle body and having:
      a spoiler body configured to control a movement of the ambient airflow along the vehicle body, the spoiler body including:
         a frame having an upper side, a lower side, a leading edge, and a trailing edge;
         a first fluid bladder arranged on the upper side of the frame;
         a second fluid bladder arranged on the lower side of the frame; and
      a mechanism configured to selectively alter a shape of each of the first and second fluid bladders via respectively supplying a fluid thereto and removing the fluid therefrom.

2. The vehicle according to claim 1, further comprising a third fluid bladder arranged on the leading edge of the frame, wherein the mechanism is configured to selectively alter a shape of the third fluid bladder via respectively supplying a fluid thereto and removing the fluid therefrom.

3. The vehicle according to claim 2, further comprising a controller configured to regulate the mechanism.

4. The vehicle according to claim 3, further comprising a road wheel and a first sensor configured to detect a rotating speed of the road wheel and communicate the detected rotating speed of the road wheel to the controller.

5. The vehicle according to claim 4, further comprising:
   a second sensor configured to detect a yaw rate of the vehicle body and communicate the detected yaw rate to the controller;
   a steering wheel configured to control a direction of the vehicle via a steering wheel angle; and
   a third sensor configured to detect the steering wheel angle and communicate the detected steering wheel angle to the controller.

6. The vehicle according to claim 5, wherein the controller is configured to regulate the mechanism to selectively supply the fluid to and remove the fluid from each of the first, second, and third fluid bladders in response to the detected yaw rate, steering wheel angle, and rotating speed of the road wheel.

7. The vehicle according to claim 6, wherein, via regulating the mechanism, the controller:
   removes the fluid from the first fluid bladder and supplies the fluid to the second fluid bladder to increase downforce and reduce the detected yaw rate;
   supplies the fluid to the first fluid bladder and removes the fluid from the second fluid bladder to decrease downforce and increase the detected yaw rate; and
   removes the fluid from each of the first and the second fluid bladders to decrease aerodynamic drag.

8. The vehicle according to claim 6, wherein:
   the vehicle body has a longitudinal body axis;
   at least one of the first, second, and third fluid bladders is split into a pair of individually inflatable bladders, such that one bladder of the pair of individually inflatable bladders is arranged to one side of the longitudinal body axis and the other bladder of the pair of individually inflatable bladders is arranged to the other side of the longitudinal body axis; and the controller is configured to regulate the mechanism to selectively and individually supply the fluid to and remove the fluid from each of the pair of individually inflatable bladders in response to the detected yaw rate, steering wheel angle, and rotating speed of the road wheel.

9. The vehicle according to claim 1, wherein the mechanism includes a fluid pump and a fluid valve configured to control supply of the fluid to each of the first, second, and third fluid bladders.

10. The vehicle according to claim 1, wherein the vehicle body includes a second vehicle body end opposite of the first vehicle body end, and wherein the spoiler body is mounted at one of the first vehicle body end and the second vehicle body end.

11. A vehicle comprising:
a vehicle body having a first vehicle body end configured to face oncoming ambient airflow when the vehicle is in motion relative to a road surface; and
a spoiler assembly mounted to the vehicle body and having:
  a spoiler body configured to control a movement of the ambient airflow along the vehicle body, the spoiler body including:
    a frame having an upper side, a lower side, a leading edge, and a trailing edge;
    a first fluid bladder arranged on the upper side of the frame; and
    a second fluid bladder arranged on the lower side of the frame;
  a mechanism configured to selectively alter a shape of each of the first and second fluid bladders via respectively supplying a fluid thereto and removing the fluid therefrom; and
  an electronic controller configured to regulate the mechanism.

12. The vehicle according to claim 11, further comprising a third fluid bladder arranged on the leading edge of the frame, wherein the mechanism is configured to selectively alter a shape of the third fluid bladder via respectively supplying a fluid thereto and removing the fluid therefrom.

13. The vehicle according to claim 11, further comprising a road wheel and a first sensor configured to detect a rotating speed of the road wheel and communicate the detected rotating speed of the road wheel to the controller.

14. The vehicle according to claim 13, further comprising a second sensor configured to detect a yaw rate of the vehicle body and communicate the detected yaw rate to the controller.

15. The vehicle according to claim 14, further comprising a steering wheel configured to control a direction of the vehicle via a steering wheel angle and a third sensor configured to detect the steering wheel angle and communicate the detected steering wheel angle to the controller.

16. The vehicle according to claim 15, wherein the controller is configured to regulate the mechanism to selectively supply the fluid to and remove the fluid from each of the first, second, and third fluid bladders in response to the detected yaw rate, steering wheel angle, and rotating speed of the road wheel.

17. The vehicle according to claim 16, wherein, via regulating the mechanism, the controller:
removes the fluid from the first fluid bladder and supplies the fluid to the second fluid bladder to increase downforce and reduce the detected yaw rate;
supplies the fluid to the first fluid bladder and removes the fluid from the second fluid bladder to decrease downforce and increase the detected yaw rate; and
removes the fluid from each of the first and the second fluid bladders to decrease aerodynamic drag.

18. The vehicle according to claim 16, wherein:
the vehicle body has a longitudinal body axis;
at least one of the first, second, and third fluid bladders is split into a pair of individually inflatable bladders, such that one bladder of the pair of individually inflatable bladders is arranged to one side of the longitudinal body axis and the other bladder of the pair of individually inflatable bladders is arranged to the other side of the longitudinal body axis; and
the controller is configured to regulate the mechanism to selectively and individually supply the fluid to and remove the fluid from each of the pair of individually inflatable bladders in response to the detected yaw rate, steering wheel angle, and rotating speed of the road wheel.

19. The vehicle according to claim 11, wherein the mechanism includes a fluid pump and a fluid valve configured to control supply of the fluid to each of the first, second, and third fluid bladders.

20. The vehicle according to claim 11, wherein the vehicle body includes a second vehicle body end opposite of the first vehicle body end, and wherein the spoiler body is mounted at one of the first vehicle body end and the second vehicle body end.

* * * * *